US007234158B1

United States Patent
Guo et al.

(10) Patent No.: US 7,234,158 B1
(45) Date of Patent: Jun. 19, 2007

(54) SEPARATE CLIENT STATE OBJECT AND USER INTERFACE DOMAINS

(75) Inventors: Wei-Quiang Michael Guo, Bellevue, WA (US); Wei Jiang, Kirkland, WA (US); Colin Chow, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 825 days.

(21) Appl. No.: 10/113,868

(22) Filed: Apr. 1, 2002

(51) Int. Cl.
*H04L 9/32* (2006.01)
(52) U.S. Cl. .......................... 726/2; 713/150; 709/229
(58) Field of Classification Search ................ 713/201, 713/202, 155, 150, 168, 182, 172; 709/224, 709/225, 229, 227, 219, 226; 705/26, 27, 705/50; 726/2, 3, 5, 8–10, 27–29; 455/411; 707/1, 2, 10
See application file for complete search history.

(56) References Cited

U.S. PATENT DOCUMENTS

| 5,682,478 | A |   | 10/1997 | Watson et al. |         |
|-----------|---|---|---------|---------------|---------|
| 5,812,776 | A | * | 9/1998  | Gifford       | 709/217 |
| 5,812,784 | A |   | 9/1998  | Watson et al. |         |
| 5,875,296 | A | * | 2/1999  | Shi et al.    | 726/5   |
| 5,898,780 | A |   | 4/1999  | Liu et al.    |         |
| 5,918,228 | A |   | 6/1999  | Rich et al.   |         |
| 5,944,824 | A |   | 8/1999  | He            |         |
| 5,948,064 | A |   | 9/1999  | Bertram et al.|         |
| 5,959,985 | A |   | 9/1999  | Freen et al.  |         |
| 5,987,232 | A | * | 11/1999 | Tabuki        | 726/5   |
| 6,006,332 | A |   | 12/1999 | Rabne et al.  |         |
| 6,055,236 | A |   | 4/2000  | Nessett et al.|         |
| 6,092,196 | A | * | 7/2000  | Reiche        | 726/6   |
| 6,092,199 | A |   | 7/2000  | Dutcher et al.|         |
| 6,134,592 | A | * | 10/2000 | Montulli      | 709/229 |
| 6,138,159 | A | * | 10/2000 | Phaal         | 709/226 |
| 6,226,752 | B1|   | 5/2001  | Gupta et al.  |         |
| 6,246,771 | B1|   | 6/2001  | Stanton et al.|         |
| 6,253,325 | B1|   | 6/2001  | Steele et al. |         |

(Continued)

FOREIGN PATENT DOCUMENTS

WO    WO 0233884 A    4/2002

OTHER PUBLICATIONS

Park et al., "Role-Based Access Control on the Web," ACM Transactions on Information and System Security (TISSEC), Feb. 2001, pp. 37-71, vol. 4, issue 1, ACM Press, New York, USA.

(Continued)

*Primary Examiner*—Kim Vu
*Assistant Examiner*—Nirav Patel
(74) *Attorney, Agent, or Firm*—Senniger Powers (57) ABSTRACT

Methods and system for routing communication between a client computer and network servers on a data communication network. In response to a request from a web server on the network to authenticate a user of the client computer, an authentication network server directs the client to a user interface network server. The user interface server provides a user interface to the user requesting login information. The authentication server, which is in a different domain than the user interface server, receives and validates the login information. The authentication server further provides a cookie to the client computer if the information retrieved from the user is valid. The cookie has a domain attribute corresponding to the domain of the authentication server.

30 Claims, 4 Drawing Sheets

U.S. PATENT DOCUMENTS

| | | |
|---|---|---|
| 6,311,275 B1 | 10/2001 | Jin et al. |
| 6,314,425 B1 | 11/2001 | Serbinis et al. |
| 6,321,262 B1 | 11/2001 | Springer |
| 6,363,365 B1 | 3/2002 | Kou |
| 6,578,199 B1 | 6/2003 | Tsou et al. |
| 6,725,376 B1 | 4/2004 | Sasmazel et al. |
| 6,763,468 B2 | 7/2004 | Gupta et al. |
| 6,973,571 B2 | 12/2005 | Lee et al. |
| 2001/0025256 A1* | 9/2001 | Oliphant .................... 705/26 |
| 2001/0034841 A1 | 10/2001 | Shambroom |
| 2001/0037462 A1 | 11/2001 | Bengtson |
| 2001/0045451 A1 | 11/2001 | Tan et al. |
| 2001/0054155 A1 | 12/2001 | Hagan et al. |
| 2002/0029350 A1 | 3/2002 | Cooper et al. |
| 2002/0035681 A1 | 3/2002 | Maturana et al. |
| 2002/0099809 A1* | 7/2002 | Lee .......................... 709/223 |
| 2002/0112155 A1* | 8/2002 | Martherus et al. .......... 713/155 |
| 2002/0133723 A1 | 9/2002 | Tait |
| 2002/0150253 A1 | 10/2002 | Brezak et al. |
| 2002/0152393 A1 | 10/2002 | Thoma et al. |
| 2002/0194501 A1 | 12/2002 | Wenocur et al. |
| 2003/0093694 A1 | 5/2003 | Medvinsky et al. |
| 2003/0149880 A1 | 8/2003 | Shamsaasef et al. |
| 2003/0163691 A1 | 8/2003 | Johnson |
| 2004/0158743 A1* | 8/2004 | Ham et al. .................. 713/201 |
| 2005/0074126 A1* | 4/2005 | Stanko ...................... 380/279 |
| 2005/0216771 A1 | 9/2005 | Malcolm |

OTHER PUBLICATIONS

Sit et al., "Inside Risks: Web Cookies: Not Just a Privacy Risk," Communications of the ACM, Sep. 2001, p. 120, vol. 44, issue 9, ACM Press, New York, USA.

Joshi et al., "Security Models for Web-Based Applications," Communications of the ACM, Feb. 2001, pp. 38-44, vol. 44, issue 2, ACM Press, New York, USA.

Sit et al., "Dos and Don'ts of Client Authentication on the Web," MIT Laboratory for Computer Science, 24 pages, USA.

Ross et al., "Cross-Site Scripting Overview," 2000, 12 pages.

Samar, "Single Sign-On Using Cookies for Web Applications," Enabling Technologies: Infrastructure for Collaborative Enterprise Proceedings, IEEE 8th International Workshops, Jun. 16, 1999, pp. 158-163.

* cited by examiner

FIG. 1

SEPARATE CLIENT STATE OBJECT AND USER INTERFACE DOMAINS

TECHNICAL FIELD

The present invention relates to the field of computer network environments. In particular, this invention relates to improved security in a multi-site user authentication system by rendering user interfaces from a different domain than the domain in which authentication is performed.

BACKGROUND OF THE INVENTION

Web sites, or Internet sites, very often provide information, products, services, or the like to their users. Many web sites require users to "register" before the sites' web servers will grant access to the users. During registration, a user typically supplies personal information such as username, account number, address, telephone number, e-mail address, computer platform, age, gender, and/or hobbies. The registration information may be necessary to complete transactions (e.g., commercial or financial transactions). Additionally, web sites often collect user information so web site operators can better target future marketing activities or adjust the content provided by the sites. The collected information may also enable web sites to contact users directly (e.g., via e-mail) to announce, for example, special promotions, new products, or new web site features.

When registering a user for the first time, the web site typically requests that the user select a login ID and an associated password. The login ID allows the web site to identify the user and retrieve the user's information during subsequent user visits to the web site. Generally, the login ID must be unique to the web site such that no two users have the same login ID. The password associated with the login ID allows the web site to authenticate the user during subsequent visits to the web site. The password also prevents others (who do not know the password) from accessing the web site using the user's login ID. This password protection is particularly important if the web site stores private or confidential information about the user, such as financial information or medical records.

If the user visits several different web sites, each web site may require entry of similar registration information about the user, such as the user's name, mailing address, and e-mail address. This repeated entry of identical data is tedious when visiting multiple web sites in a short period of time. Many web sites require the user to register before accessing any information provided on the site. Thus, the user must first enter the requested registration information before he or she can determine whether the site contains any information of interest.

After registering with multiple web sites, the user must remember the specific login ID and password used with each web site or other Internet service. Without the correct login ID and password, the user must re-enter the registration information. A particular user is likely to have different login IDs and associated passwords on different web sites. For example, a user named Bob Smith may select "smith" as his login ID for a particular site. If the site already has a user with a login ID of "smith" or requires a login ID of at least six characters, then the user must select a different login ID. After registering at numerous web sites, Bob Smith may have a collection of different login IDs, such as: smith, smith1, bsmith, smithb, bobsmith, bob_smith, and smithbob. Further, different passwords may be associated with different login IDs due to differing password requirements of the different web sites (e.g., password length requirements or a requirement that each password include at least one numeric character and/or at least one uppercase character). Thus, Bob Smith must maintain a list of web sites, login IDs, and associated passwords for all sites that he visits regularly.

Although presently available multi-site user authentication systems permit a web user to maintain a single login ID (and associated password) for accessing multiple web servers or services, further improvements are desired. For example, a web server typically sends a "cookie" to a browser to capture the current state of a web session and stores the cookie on the user's local system to identify the user and maintain the session. In general, a cookie is a block of data that a server returns to a client in response to a request from the client. The browser automatically includes the cookie in subsequent communications with the server. Otherwise, the user would be required to repeatedly re-enter username/password information in, for example, an authentication session. Unfortunately, the use of cookies presents potential security risks for the user. Those skilled in the art are familiar with cookies and their use by server side connections to both store and retrieve information on the client side of the connection.

Presently available web browsers maintain no state with a web server other than the cookie, which is a client state object. When the user returns to a particular web site, the browser sends a copy of the appropriate cookie back to the server to identify the user or otherwise submit information to the server on behalf of the user. The cookie has a domain attribute that must match the server's domain for the server to access the cookie. The server typically uses this information for customizing and retaining the site's settings for the user across multiple sessions. Cookie syntax and structure, including the presence of a domain attribute for comparison to the domain of the host from which information will be fetched, are well known in the art. Moreover, one of ordinary skill in the art would expect an authentication system to store critical security information in cookies. Although each site should maintain its own cookies on the user's machine and be able to access only those particular cookies, the potential exists for unauthorized access to cookies and the potentially sensitive information stored in them.

Those skilled in the art are familiar with script injection as a common attack on a cookie-based system. One technique for injecting a script (i.e., downloading from the server to run on the client) is to deceive the user with a bogus user interface (e.g., "click here for free tickets"). Another technique for injecting a script involves the use of overlapping frames in which the attack content remains unseen by the user because real content overlaps it. In any event, the malicious script injected into a web page can access the cookies, which creates a security breach. Conventional techniques for safeguarding against script injection include input and/or output filtering to turn off script injection. Unfortunately, it is difficult to filter out every type of script and every script. Therefore, these filtering techniques require laborious efforts in development and testing to ensure that every piece of input/output data is scrutinized carefully. As an example of conventional output filtering used on an authentication site, the Hypertext Markup Language (HTML) source includes the following HTML statement:

<input TYPE="hidden" NAME="ru"

value="http:// www.authsite.com">$script$alert$document.cookie$$$/ script$">

In this instance, the $ characters have replaced the "< >;" on the query string. As described above, this technique is highly laborious and requires attention to detail across a large development team, particularly in the context of a multi-site user authentication service affiliated with a large number of web services.

Further, filtering out script injection fully is not possible for certain web-based functionalities (e.g., co-branding of web sites). Co-branding, which involves content aggregation between sites, relies heavily on third party client scripts. For this reason, it is practically impossible to enforce correct input/output filtering among all of the affiliated sites. In addition, all of the different encoding rules used in html make the task of preventing script injection through filtering very likely to fail. Filtering out script injection can also lead to malformed input/output data.

For these reasons, a browser security model is desired for preventing access to a user's cookies by client scripts without the need for labor-intensive and error-prone filtering techniques. In other words, a reliable solution to script injection is desired, particularly for use in a cookie-based web authentication system.

SUMMARY OF THE INVENTION

The invention meets the above needs and overcomes one or more deficiencies in the prior art by providing improved security for a multi-site user authentication system. A browser security model reduces the risk of unauthorized access to sensitive information stored in cookies associated with the web authentication system. According to one aspect of the invention, rendering the authentication user interfaces in a domain that is different from the cookies' domain defeats malicious script injection. Advantageously, the invention safeguards against script injection attacks architecturally without relying on input/output data filtering. Moreover, the features of the present invention described herein are less laborious, easier to implement and test, less prone to errors, and more reliable than currently available techniques as well as being economically feasible, and commercially practical.

Briefly described, a method embodying aspects of the invention routes communication between a client computer and network servers that are coupled to a data communication network. The client computer operates a browser configured to permit a user of the client computer to communicate on the data communication network. The method includes providing a user interface to the user of the client computer via the browser. The user interface, provided by a first network server coupled to the data communication network, requests information to be retrieved from the user. The method also includes receiving and validating the information retrieved from the user with a second network server coupled to the data communication network. According to one aspect of the invention, the first and second network servers are in different domains on the data communication network. The method further includes providing a client state object from the second network server to the browser of the client computer if the information retrieved from the user is valid. In this instance, the client state object has a domain attribute corresponding to the domain of the second network server.

In another embodiment, a method according to the invention includes receiving a request from a web server to authenticate a user of a client computer, directing the client computer from the web server to an authentication server in response to the request, and then directing the client computer from the authentication server to a user interface server. The web server, client computer, authentication server, and user interface server are coupled to a data communication network and the user is seeking access to the web server via the data communication network. The client computer operates a browser configured to permit the user to communicate on the data communication network. The method also includes providing a user interface to the user via the browser for retrieving login information from the user and posting the login information retrieved from the user to the authentication server. The user interface server, which is in a different domain on the data communication network than the authentication server, provides the user interface server to the user. The method further includes authenticating the user by the authentication server based on the login information retrieved from the user and, if the user is authenticated, providing a cookie from the authentication server to the browser of the client computer. In this instance, the cookie has a domain attribute corresponding to the domain of the authentication server.

Yet another aspect of the invention is embodied by a system including first and second network servers coupled to a data communication network. According to the invention, the first and second network servers are in different domains on the data communication network. A client computer operates a browser configured to permit a user of the client computer to communicate on the data communication network. The first network server provides a user interface to the user of the client computer via the browser. The user interface requests information to be retrieved from the user. The second network server receives and validates the information retrieved from the user. The second network server further provides a client state object to the browser of the client computer if the information retrieved from the user is valid. The client state object has a domain attribute corresponding to the domain of the second network server.

Alternatively, the invention may comprise various other methods and apparatuses.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

The present invention relates to improved security in a distributed, multi-site user authentication system (e.g., Microsoft® Passport sign-in service). In a web-based authentication service, an authentication server uses a cookie containing the user's login information (and possibly other confidential information) to obviate the need for repeatedly re-entering username/password information. Those skilled in the art are familiar with a number of security problems associated with cookie-based systems. For example, when a malicious script is injected into a web page, the script can be used to steal cookies, which creates a breach in security for the authentication system. Conventional techniques for safeguarding against script injection (e.g., input and/or output filtering) provide a level of protection but improvements are still desired. Advantageously, the present invention provides a browser security model that prevents access to cookies by client scripts. In one embodiment, the invention renders all user interfaces for the authentication system in a user interface domain separate from the cookies' domain. Local client scripts operate only in the domains to which they are associated. Therefore, any malicious scripts injected in the user interface domain for the purpose of stealing cookies cannot access the cookie set in the cookies' domain because it is in a different domain. This serves to defeat script injection completely architecturally rather than through filtering.

Figure 1:
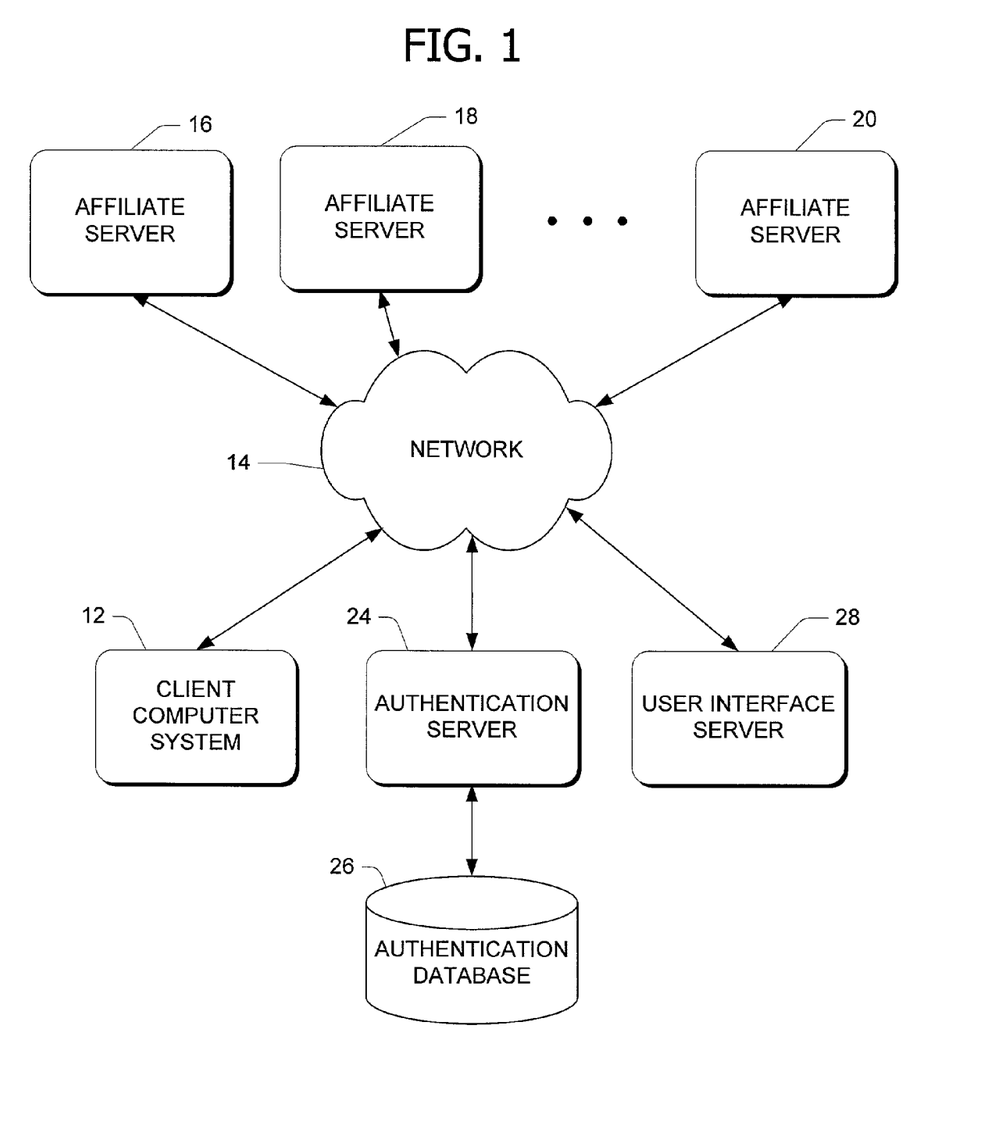
FIG. 1 is a block diagram illustrating an exemplary network environment in which the present invention is utilized.

Referring now to the drawings, FIG. 1 illustrates an exemplary network environment in which the present invention is utilized. A client computer system 12 is coupled to a data communication network 14. In this example, the network 14 is the Internet (or the World Wide Web). However, the teachings of the present invention can be applied to any data communication network. Multiple affiliate servers 16, 18, and 20 are also coupled to network 14. In turn, the client computer system 12 can access the affiliate servers 16, 18, and 20 via network 14. Affiliate servers 16, 18, and 20 are also referred to as "web servers" and "network servers." An authentication server 24 coupled to network 14 allows communication between itself and client computer system 12 and web servers 16, 18, and 20. Although referred to as an "authentication server," authentication server 24 in the illustrated embodiment is also a web server capable of interacting with web browsers and other web servers. In this example, data is communicated between authentication server 24, client computer system 12, and web servers 16, 18, 20 using the hypertext transfer protocol (HTTP), a protocol commonly used on the Internet to exchange information.

An authentication database 26 is coupled to authentication server 24. The authentication database 26 contains information necessary to authenticate users and also identifies which elements of the user profile information should be provided to a particular affiliate server when the user accesses the affiliate server. In the illustrated embodiment of the invention, authentication server 24 and authentication database 26 constitute a central server and a central database, respectively. Although the authentication database 26 is shown separately from authentication server 24, in other embodiments of the invention, authentication database 26 is contained within authentication server 24.

The authentication process, as described below, authenticates a user of client computer 12 seeking access to an affiliate server 16, 18, or 20. Authentication server 24 authenticates the user of client computer 12 by requesting authenticating information, such as the user's login ID and password. If the user is successfully authenticated, then authentication server 24 routes client computer 12 to the appropriate affiliate server for performing a desired service for the user.

As part of the user authentication process, authentication server 24 may provide certain user profile information to the affiliate server, such as the user's e-mail address, user preferences, and the type of Internet browser installed on client computer 12. This user profile information is associated with the user's login ID so that each time the user logs into an affiliate server, the associated user profile information is available to provide to the affiliate server. This user profile allows the user to enter the information once and use that information during subsequent logins to new affiliate servers.

In one embodiment, an "affiliate server" is a web server that has "registered" or otherwise established a relationship or affiliation with authentication server 24. Each affiliate server 16, 18, and 20 includes a code sequence (not shown) that allows the affiliate server to communicate with authentication server 24 when a user (who is also registered with the authentication server) requests access to the affiliate server. Additional details regarding the authentication process and the interaction between client computer 12, affiliate servers 16, 18, 20, and authentication server 24 are provided below.

Prior to executing the authentication process described below, both the user of client computer system 12 and the operator(s) of affiliate servers 16, 18, 20 "register" with authentication server 24. This registration is a one-time process that provides necessary information to the authentication server. The user of client computer system 12 registers with authentication server 24 by providing, for example, the user's name, mailing address, and e-mail address, and/or other information about the user or client computer system 12. As part of the user registration process, the user is assigned (or selects) a login ID, which is a common login ID, used to access any affiliate server (e.g., server 16, 18, 20). The login ID may also be referred to herein as a "username" or "login name". Additionally, the user selects a password associated with the login ID that is used for authentication purposes. After registering and logging into the authentication server, the user can visit any affiliate server (i.e., affiliate servers that are also registered with the same authentication server) without requiring any additional authentication and without re-entering user information that is already contained in the associated user profile.

The operator(s) of affiliate servers 16, 18, 20 register with authentication server 24 by providing information about the affiliate server (e.g., server name and Internet address). Additionally, each affiliate server 16, 18, 20 provides information regarding its authentication requirements. The requirements for authentication may be specified in terms of a maximum time allowed since the last login and entry of authentication information by the user. These requirements may also be specified by the maximum time allowed since the last "refresh" of the authentication information by the user. Refreshing the authentication information refers to the process of having the user re-enter the password to be certain that the appropriate user is still operating client computer system 12. This periodic refreshing of authentication information is useful if the user leaves his or her computer system without logging out of authentication server 24, thereby allowing another individual to access affiliate servers 16, 18, and 20 using the login ID of the previous user. If a user requests access to one of the affiliate servers 16, 18, and 20 after the maximum allowed time has lapsed, then authentication server 24 re-authenticates (i.e., refreshes) the user. Thus, although there is a central authentication server 24, affiliate servers 16, 18, 20 can establish their own authentication requirements to be enforced by the authentication server. After registering with authentication server 24, affiliate servers 16, 18, 20 can use the authentication server to authenticate any user that has also registered with the authentication server.

In one embodiment of the invention, authentication server 24 sends a cookie to the web browser of client computer 12 to capture the current state of an authentication session. Although not limited to such browsers, two examples of suitable browsers for use in connection with the present invention are those shipped with Microsoft® Internet Explorer and Netscape Navigator®. As described above, the server stores the cookie on the user's local system (i.e., client computer 12) to identify the user and maintain the session. The browser automatically includes the cookie in subsequent requests. This obviates the need for the user to repeatedly re-enter username/password information.

Referring further to FIG. 1, this embodiment of the multi-site user authentication system includes a user interface (UI) server 28 in addition to authentication server 24. The server 28 permits all of the user interfaces for the authentication system to be rendered in a separate domain than the cookies, which defeats script injection attacks.

Figure 2:
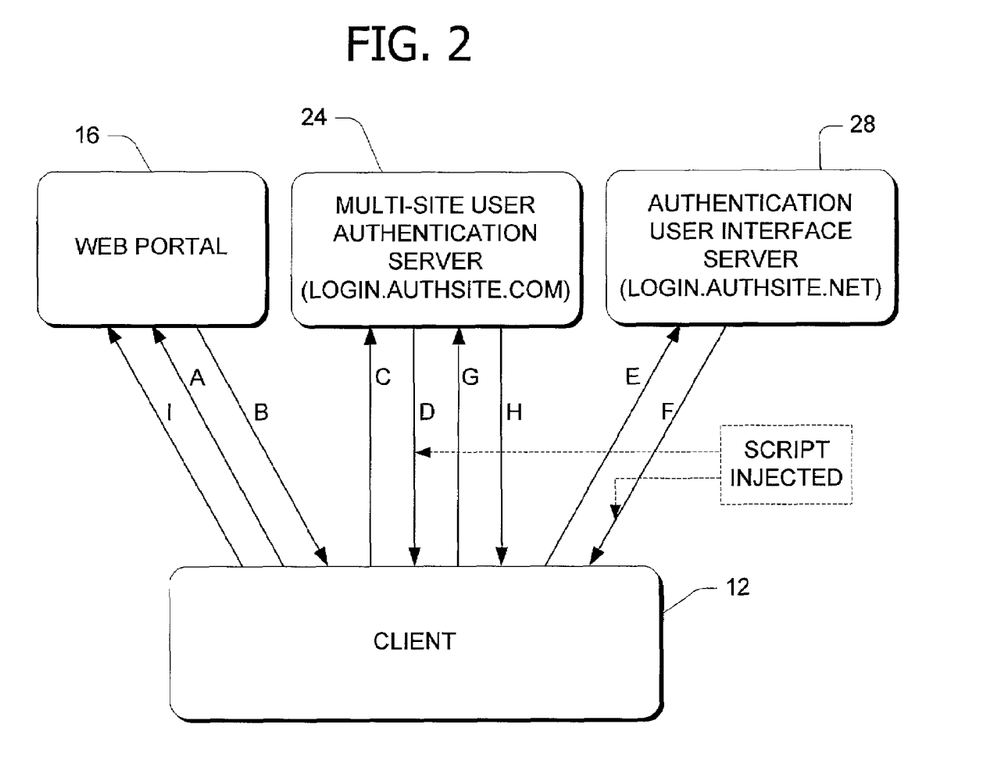
FIGS. 2 and 3 are exemplary flow diagrams illustrating the interaction between a client computer, an affiliate server, an authentication server, and a user interface server of FIG. 1 when a user of the client computer seeks access to the affiliate server.

FIG. 2 is an exemplary flow diagram illustrating an implementation of the present invention and the interaction between client computer system 12, at least one affiliate server 16, authentication server 24, and user interface server 28 when a user of the client computer system seeks access to one of the affiliate servers. In FIG. 2, a browser security model prevents access to cookies by client scripts architecturally rather than through filtering. According to the invention, an injected client script cannot access the user's cookie set because the injected client script is in a different domain (i.e., login.authsite.net at user interface server 28 versus login.authsite.com at authentication server 24). Even if a malicious client script is injected into a user interface web page, the script is now unable to steal any cookies in the domain of the authentication server 24.

It is to be understood that user interface server 28 (the first network server) and authentication server 24 (the second network server) may be embodied as a single network server with two network interfaces. Each of the network interfaces corresponds to a domain separate from the domain of the other network interface. In another embodiment, a single network interfaces supporting multiple domains allows a single network server to perform the method illustrated in FIGS. 2 and 3.

The illustrated example of FIG. 2 describes the situation in which the user of client computer system 12 has not yet logged into affiliate server 16 and has not yet been authenticated by authentication server 24. The lines in FIG. 2 labeled "A" through "I" represent the flow of information or activities during the authentication process. The arrows on the lines indicate the direction of the process flow. The label "A" represents the beginning of the processes and the label "I" represents the end of the process.

Figure 3:
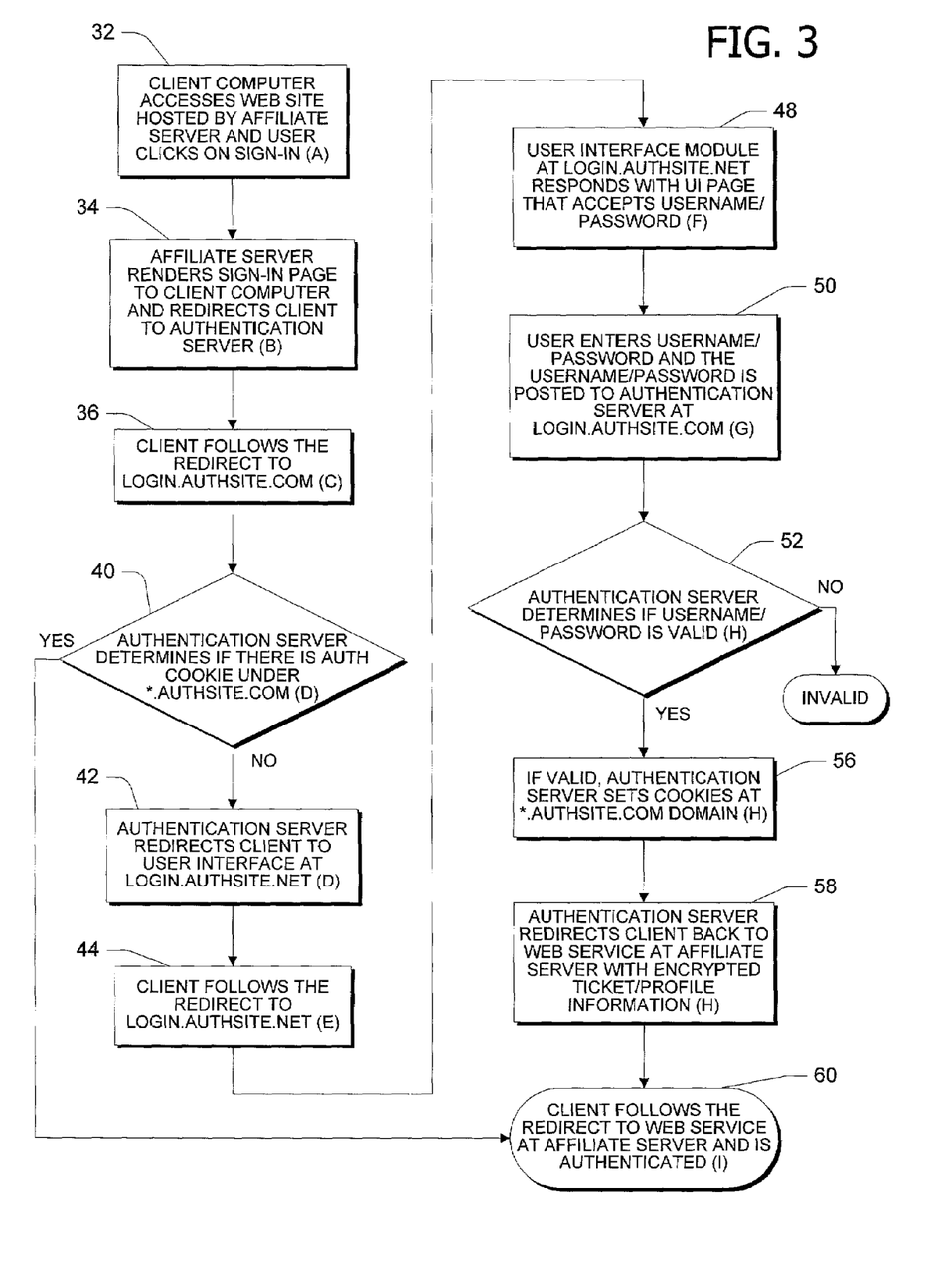

In the exemplary process flow of FIGS. 2 and 3, the user of client computer system 12 begins at 32 by accessing a portal service (e.g., MSN® network of Internet services at http://www.msn.com) available via affiliate server 16. At 32, the user selects one of the services available through the portal. For example, the user accesses an online shopping service, or another web service, available through the portal by clicking on a link (e.g., http://eshop.msn.com/). In doing so, the affiliate server 16 presents the user with a sign-in interface (e.g., "click here to login"). (See A).

Proceeding to 34 and 36, the portal service at affiliate server 16 redirects client computer system 12 to the multi-site user authentication system provided by authentication server 24 (e.g., Microsoft® Passport sign-in service) when the user clicks on the sign-in interface. (See B). In the example of FIGS. 2 and 3, affiliate server 16 redirects client computer system 12 to login.authsite.com with the following uniform resource locator (URL):

http://login.authsite.com/
login.asp?id=2445&ru=http%3A%2F%2Feshop%2E
msn%2Ecom%2Fwishlist%2Fwishlist%2Easpx&tw=
10000&fs=1&kv=2&ct=10
08728265&cb=&ns=&KPP=0&ver=1.990.1052.1&C=1

The client computer system 12 follows the redirect command issued by the portal at 36. (See C). At 40, authentication server 24 determines if there is an authentication cookie under the *.authsite.com domain. If not, authentication server 24 redirects client computer 12 to the UI server 28 at 42. In this example, UI server 28 is located at login.authsite.net with the following URL:

http://login.authsite.net/login.srf?id=3&ru=http://
www.authsite.com"><script>al ert(document.cookie);</
script>

(See D). Client computer 12 then follows the redirect to login.authsite.net at 44 to present the user with a sign-in user interface. (See E). In this embodiment, information is carried over via a Base 64 encoding mechanism or the like. Thus, all user interfaces are rendered in one domain while all cookies are in another domain separate from the UI domain. According to the invention, any script injected into login.authsite.net cannot access the cookies under *.authsite.com because of the domain change.

In one embodiment, the query string is not carried over. Instead, the user sees the URL as http://login.authsite.net/login.srf and all of the query string information is posted over. This has the added benefit of allowing the end user to clearly see the URL that he or she is working with. Otherwise, the URL may become too long and be shifted to the left off of the screen. The user is less likely to fall victim to UI spoofing in this embodiment because the user knows where not to enter his or her username/password.

Proceeding to 48, UI server 28 at login.authsite.net responds with a UI page that accepts a username/password from the user. Such UI includes, for example, text boxes for the user to type in his or her username and password information. (See F). The user interface server 28 prompts the user to enter login information (e.g., e-mail username and password) for verification with the information stored in authentication database 26. According to the invention, authentication server 24 uses UI server 28 to display the interface but authentication server 24 accepts the login information directly from the user (i.e., the login information does not go through UI server 28 first). At 50, the client computer system 12 posts the user's credentials (e.g., username/password) to authentication server 24 at login.authsite.com. (See G). In one embodiment of the invention, client computer system 12 communicates confidential information, such as the login ID and password, to authentication server 24 using a secure protocol (e.g., secure sockets layer (SSL)). Various other secure protocols or encryption mechanisms can be used to communicate confidential information between authentication server 24 and client computer system 12.

The authentication server 24 then validates the username/password provided by the user at 50. If the validation, which occurs at 52, is successful, authentication server 24 sets cookies (e.g., MSPAuth/MSPProf/MSPSec) at the *.authsite.com domain at 56. Proceeding to 58, authentication server 24 also looks up the desired web service location and redirects client computer system 12 to the appropriate service (e.g., http://eshop.msn.com/) with encrypted ticket/profile information. (See H). In other words, authentication server 24 retrieves the appropriate location information from authentication database 26 to identify the location of server 16 (or server 18 or 20) providing the selected service. Client computer 12 then follows the redirect at 60 to the web service at affiliate server 16 and is authenticated. (See I).

Returning to 52, if the user-entered information is not correct (i.e., it does not match the information stored in authentication database 26), then authentication server 24 generates and communicates a web page to the user indicating the login ID and password combination was not valid. In the event of username and/or password failure, security concerns, for example, may limit the number of times the user can attempt to login.

The diagrams of FIGS. 2 and 3 illustrate one exemplary implementation of the invention. All cookie creation and interpretation functionalities are in the login.authsite.com domain, and all user interfaces are at login.authsite.net domain. Prior to implementing this invention, operations at E and F are optional because, at D, the authentication server 24 at login.authsite.com could have responded with the user interface.

Appendix A provides specific examples of data sent at each of the lines in FIG. 2 labeled "A" through "I" representing the flow of information or activities during the authentication process.

Figure 4:
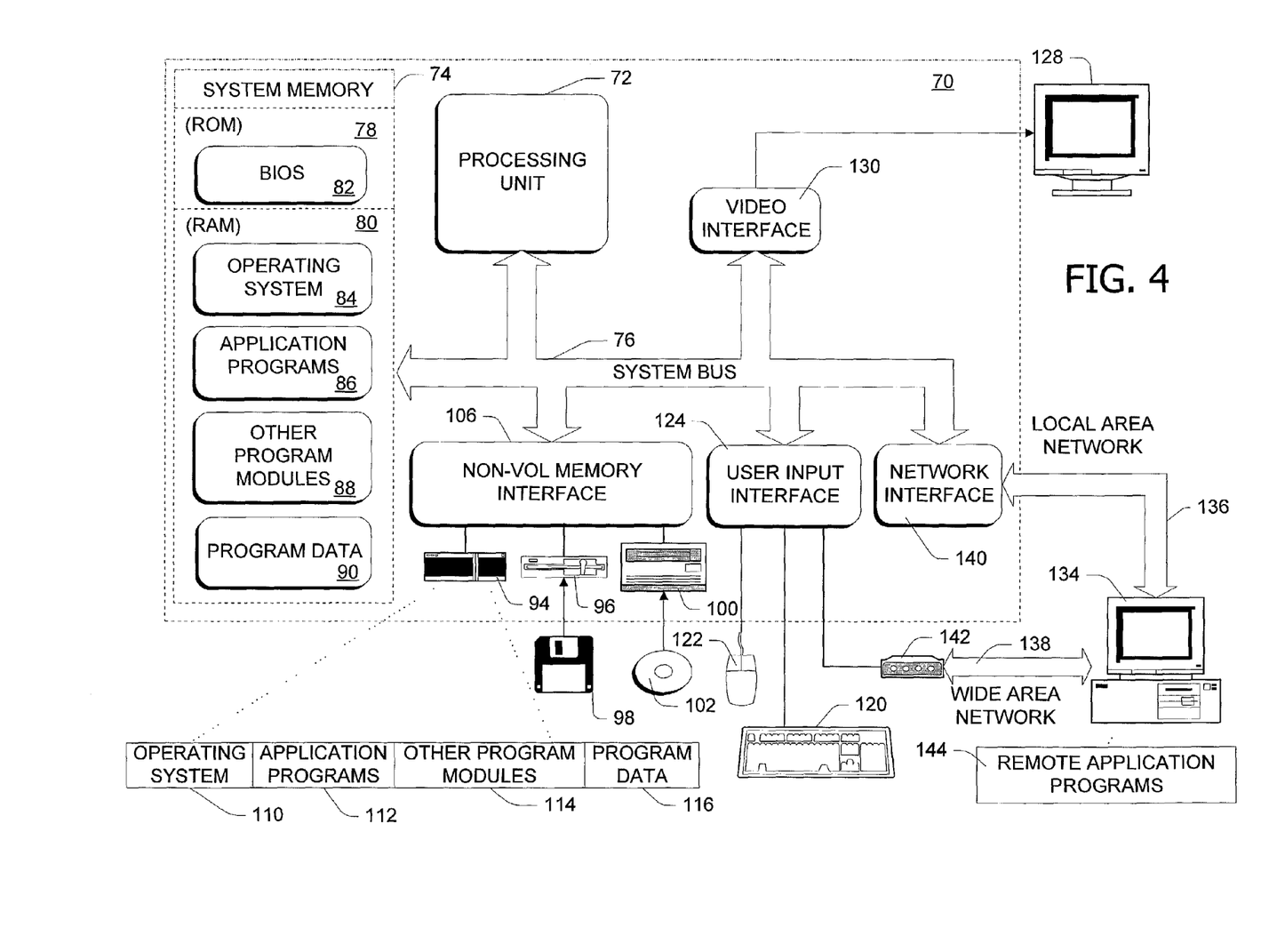
FIG. 4 is a block diagram illustrating components of a computer for use in the system of FIG. 1.

FIG. 4 shows one example of a general purpose computing device in the form of a computer 70. In one embodiment of the invention, a computer such as the computer 70 is suitable for use in client computer system 12, authentication server 24, user interface server 28, or any of affiliate servers 16, 18, and 20.

In the illustrated embodiment, computer 70 has one or more processors or processing units 72 and a system memory 74. In the illustrated embodiment, a system bus 76 couples various system components including the system memory 74 to the processors 72. The bus 76 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 70 typically has at least some form of computer readable media. Computer readable media, which include both volatile and nonvolatile media, removable and non-removable media, may be any available medium that can be accessed by computer 70. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 70. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 74 includes computer storage media in the form of removable and/or non-removable, volatile and/or nonvolatile memory. In the illustrated embodiment, system memory 74 includes read only memory (ROM) 78 and random access memory (RAM) 80. A basic input/output system 82 (BIOS), containing the basic routines that help to transfer information between elements within computer 70, such as during startup, is typically stored in ROM 78. The RAM 80 typically contains data and/or program modules that are immediately accessible to and/or presently being operated on by processing unit 72. By way of example, and not limitation, FIG. 4 illustrates operating system 84, application programs 86, other program modules 88, and program data 90.

The computer 70 may also include other removable/non-removable, volatile/nonvolatile computer storage media For example, FIG. 4 illustrates a hard disk drive 94 that reads from or writes to non-removable, nonvolatile magnetic media. FIG. 4 also shows a magnetic disk drive 96 that reads from or writes to a removable, nonvolatile magnetic disk 98, and an optical disk drive 100 that reads from Or writes to a removable, nonvolatile optical disk 102 such as a CD-ROM or other optical media. Other removable/non-removeable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 94, and magnetic disk drive 96 and optical disk drive 100 are typically connected to the system bus 76 by a non-volatile memory interface, such as interface 166.

The drives or other mass storage devices and their associated computer storage media discussed above and illustrated in FIG. 4, provide storage of computer readable instructions, data structures, program modules and other data for the computer 70. In FIG. 4, for example, hard disk drive 94 is illustrated as storing operating system 110, application programs 112, other program modules 114, and program data 116. Note that these components can either be the same as or different from operating system 84, application programs 86, other program modules 88, and program data 90. Operating system 110, application programs 112, other program modules 114, and program data 116 are given different numbers here to illustrate that, at a minimum, they are different copies.

A user may enter commands and information into computer 70 through input devices such as a keyboard 120 and a pointing device 122 (e.g., a mouse, trackball, pen, or touch pad). Other input devices (not shown) may include a microphone, joystick, game pad, satellite dish, scanner, or the like. These and other input devices are connected to processing unit 72 through a user input interface 124 that is coupled to system bus 76, but may be connected by other interface and bus structures, such as a parallel port, game port, or a universal serial bus (USB). A monitor 128 or other type of display device is also connected to system bus 76 via an interface, such as a video interface 130. In addition to the monitor 128, computers often include other peripheral output devices (not shown) such as a printer and speakers, which may be connected through an output peripheral interface (not shown).

The computer 70 may operate in a networked environment using logical connections to one or more remote computers, such as a remote computer 134. The remote computer 134 may be a personal computer, a server, a router, a network PC, a peer device or other common network node, and typically includes many or all of the elements described above relative to computer 70. The logical connections depicted in FIG. 4 include a local area network (LAN) 136 and a wide area network (WAN) 138, but may also include other networks. Such networking environments are commonplace in offices, enterprise-wide computer networks, intranets, and global computer networks (e.g., the Internet).

When used in a local area networking environment, computer 70 is connected to the LAN 136 through a network interface or adapter 140. When used in a wide area networking environment, computer 70 typically includes a modem 142 or other means for establishing communications over the WAN 138, such as the Internet. The modem 142, which may be internal or external, is connected to system bus 76 via the user input interface 124, or other appropriate mechanism. In a networked environment, program modules depicted relative to computer 70, or portions thereof, may be stored in a remote memory storage device (not shown). By way of example, and not limitation, FIG. 4 illustrates remote application programs 144 as residing on the memory device. It will be appreciated that the network connections shown are exemplary and other means of establishing a communications link between the computers may be used.

Generally, the data processors of computer 70 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 70, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

When introducing elements of the present invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions and methods without departing from the scope of the invention, it is intended that all matter contained in the above description and shown in the accompanying drawings shall be interpreted as illustrative and not in a limiting sense.

APPENDIX A (A)
http-header:
GET /default.asp.HTTP/1.1
Accept: image/gif, image/x-xbitmap, image/jpeg, image/pjpeg, */*
Accept-Language: en-us..Accept-Encoding:.gzip,.deflate
User-agent: Mozilla/4.0.(compatible;.MSIE.6.0;.Windows.NT.5.0;.Q312461;..NET.CLR.1.0.3705)
Host: dev-b.ptpartner1.test.microsoft.com
Connection: Keep-Alive..
http-body: none
(B)
http-header:
HTTP/1.1.200.0K
Server:.Microsoft-IIS/5.0..Date:.Thu,.14.Mar.2002.02:36:57.GMT
Cache-Control:.no-cache
Pragma:.no-cach
Content-Length:.4662
Content-Type:.text/html..Expires:.Thu,.14.Mar.2002.02:36:57.GMT

APPENDIX A-continued

```
Set-Cookie:.ASPSESSIONIDGQQGQZQG=DCGFFPDPNLJCLAHEPHNHDEF;.path=/
Cache-control:.private
http-body: it contains a image that the user can click, the the click will send the
client to the login authentication server.
<A.HEF="http://login.authsite.com/login.srf?lc=1033&id=21&ru=http%3A%2F%2Fdev%2Db%2Eptpar
tner1%2Ete
st%2Emicrosoft2Ecom%2Fdefault%2Easp&tw=300&kv=1&ct=1016073417&cb=0&ems=1&ver=2.
2.0066.1&tpf=bd8176212eea6434ccbee27d7d1bb0dd"><IMG.SRC="http:/images-b.net.pdm
sn.test.microsoft.com/1033/signin.gif".CLASS="PassportSignIn".BORDER="0".ALT=".
NET.Passport"/></A>
(C)
http-header:
GET./login.srf?lc=1033&id=21&tw=300&kv=1&ct1016073417&cb=0&ems=1&tpf=bd8176212eea6434
ccbee27d7d1bb0dd.HTTP/1.1
Accept:.image/gif,.image/x-xbitmap,.image/jeg,.image/pjpeg,.*/*
Referer:.http://dev-b.ptparter1.test.microsoft.com/default.asp
Accept-Language:.en-us..Accept-Encoding:.gzip,.deflate
User-Agent:.Mozilla/4.0.(compatible.MSIE.6.0;.Windows.NT.5.0;.Q312461;..NET.CLR.1.0.3705)
Host:.login.authsite.com
Connection:.Keep-Alive
http-body: none
(D)
http-header:
HTTP/1.1.200.OK
Server:.Microsoft-IIS/5.0..Date:.Thu,.14.Mar.2002.02:36:58.GMT
Expires:.Thu,.14.Mar.2002.02:35:58.GMT
Cache-Control:.no-cache
cachecontrol:.no-store
Pragma:.no-cache
P3P:.CP="DSP.CUR.OTPi.IND.OTRi.ONL.FIN"
Set-Cookie:.MSPRequ=lt=1016073418&co=1&id=21
Content-Length:.1433....
http-body: contains a form that post querystring, etc to login.authsite.net, with base64 encoding
<form.name=hiddenform action="http://login.authsite.net/uilogin.srf" method=POST>
<input.type=hidden.name="mspprawqs".value="bGM9MTAzMyZpZD0yMSZydT1odHRwJTNBJTJGJ
TJGZGV2JTJEYiUyRXB0cGFy
dG5lcjElMkV0ZXN0JTJFbWljcm9zb2Z0JTJFY29tJTJGZGVmYXVsdCUyRWFzcCZ0dz0zMDAma3Y9
MSZ
jdD0xMDE2MDczNDE3JmNiPTAmZW1zPTEmdmVyPTIuMi4wMDY2LjEmdHBmPWJkODE3NjIxMm
VlYTY0Mz
RjY2JlZTl3ZDdkMWJiMGRk">
</form>
(E)
http-header:
POST /uilogin.srf HTTP/1.1
Accept:.image/gif,.image/x-xbitmap,.image/jpeg,.*/*
Referer:.http://login.authsite.com/login.srf
Accept-Language:.en-us..Content-Type:.appication/x-www-form-urlencoded
Accept-Encoding:.gzip,.deflate
User-Agent:.Mozilla/4.0.(compatible;.MSIE.6.0;.Windows.NT.5.0;.Q312461;..NET.CLR1.0.3705)
Host:.login.authsite.net
Content-Length:.448..Connection:.Keep-Alive
Cache-Control:.no-cache..Cookie:.MSPPre=chow@test2.com;....
http-body: all the query paramters to login.authsite.com are posted over to login.authsite.net
mspprawqs=bGM9MTAzMyZpZD0yMSZydT1odHRwJTNBJTJGJTJGZGV2JT
JEYiUyRXB0cGFydG5lcjEIMkV0ZXN0JTJFbWIjcm9zb2Z0JTJFY29tJTJGZGVmYXVsdCUyRWFzCZ
0dz
0zMDAma3Y9MSZjdD0xMDE2MDczNDE3JmNiPTAmZW1zPTEmdmVyPTIuMi4wMDY2LjEmdHBm
PWJkODE3N
jIxMmVlYTY0MzRjY2JlZTl3ZDdkMWJiMGRk
(F)
http-header:
HTTP/1.1 200 OK
Server: Microsoft-IIS/5.0..Date: Thu, 14 Mar 2002 18:17:32 GMT
Expires: Thu, 14 Mar 2002 18:16:32 GMT
Cache-Control: no-cache
cachecontrol: no-store
Pragma: no-cache
P3P: CP="DSP CUR OTPi IND OTRi ONL FIN"
Set-Cookie: MSPRequ=lt=1016129852&co=1&id=21
Content-Type: text/html
Content-Length: 17845..
http-body: contains a HTML form that accepts username/pwd.
<form name="form 1" action="https://login-
c.com.pdmsn.test.microsoft.com/ppsecure/post.srf?lc=1033&id=10&ru=http://ulmemsvc-
c.net.pdmsn.test.microsoft.com/memberservice.srf%3flc%3d1033&tw=20&da=passport.com"
method="post">
<input type="text" name="login" maxlength="129"size="25" value="<Type your e-mail
address>"></td>
```

APPENDIX A-continued

```
<input type="password" name="passwd" maxlength="16" size="25" tabindex="2"
autocomplete="OFF"></td>
</form>
(G)
http-header: user types in username/pwd and submit
POST /ppsecure/post.srf?lc=1033&id=21&tw=300&kv=1&cb=0&cbid=21&ts=-2 HTTP/1.1
Accept: image/gif, image/x-xbitmap, */*
Referer: http://login.authsite.net/uilogin.srf
Accept-Language: en-us
Content-Type: application/x-www-form-urlencoded
Accept-Encoding: gzip, deflate
User-Agent: Mozilla/4.0 (compatible; MSIE 6.0; Windows NT 5.0; Q312461;
Host: login.authsite.com
Content-Length: 74
Connection: Keep-Alive
Cache-Control: no-cache
Cookie: MSPPre=cchow@test.com; ....
http-body: username/pwd posted in the body section
log in=cchow@test.com&domain=passport.com&passwd=password&sec=&mspp_shared=
(H)
http-header: set-cookies for login.authsite.com
HTTP/1.1 200 OK
Server: Microsoft-IIS/5.0..Date: Thu, 14 Mar 2002 18:17:41 GMT
Expires: Thu, 14 Mar 2002 18:16:40 GMT
Cache-Control: no-cache
cachecontrol: no-store
Pragma: no-cache..P3P: CP="DSP CUR OTPi IND OTRi ONL FIN"
Set-Cookie:
MSPSec=2rpJxJnOVC*PrG3UVp0vgfOiVGo5RruxsIIiG6HdwBUhFg8Y1EvBsV5OemmgPf7OIM;d
omain=.com.pdmsn.test.microsoft.com;path=/;secure=
Set-Cookie:
MSPAuth=2rpJxJnOVDvYkdeORrd9yWjCVGo5RruxsITUjr*uBsK18aP!SnS!7njpEllch3hNcUA3SnYA
GOH1DrzJOXDyy
yew$$;domain=.com.pdmsn.test.microsoft.com;path=/
Set-Cookie:
MSPProf=2rpJxJnOVB1Zd69TEJioalAuuwg*ZAjl1YYmcpsa3NHQz619PcrjO9JfitjuCrBQv3wHJPWdw
WmczMUoThx9dLW
qwpZWXpkAnpN1mIwar4vhaxIM3GMzi7LLhotaMUCzhmnqIK7fHR5co$;domain=.com.pdmsn.test.
microsoft.com;path=/
Set-Cookie: MSPVis=21;domain=.com.pdmsn.test.microsoft.com;path=/
Set-Cookie:
MSPPre=cchow@test.com;domain=.com.pdmsn.test.microsoft.com;path=/; Expires=Wed, 30-Dec-
2037 16:00:00 GMT
Set-Cookie: MSPShared=;domain=.com.pdmsn.test.microsoft.com;path=/;Expires=Thu, 30-Oct-1980
16:00:00 GMT..
http-body: send the user to webportal with &t&p on the querystring
<HTML><HEAD><meta HTTP-EQUIV="Content-Type" content="text/html; charset=iso-885
9-1"><META HTTP-EQUIV="REFRESH" CONTENT="0; URL=http://dev-b.ptpartner1.test.mi
crosoft.com/default.asp?did=1&t=1rpJxJnOVDrwbn5c2jhC1NlGx2ej2acktWZgX5sOB44RFKa
MQxBUhbAMSlhq*LwqN15enoge*8jtLIMDTpEaVN3A$$&p=1rpJxJnOVBgo5ZzyMIJUZMb0L!sia3A9J
S6fPbzQmT*Pi3KB2tc3BkzF7WZZwYu2MihQI!CV71xnzDL1tH9pamhz2Fd9cJPva8iQbJ5cGsChF0II
P9ekAU*pdbe8eIG3r3HP8QDZ71iz0$"><script>function OnBack( ){ }</script></HEAD></HTML>
(I)
http-header:
GET /default.asp?did=1&t=1rpJxJnOVDrwbn5c2jhC1NIGx2ej2acktWZgX5sOB44RFKa
MQxBUhbAMSlhq*LwqN15enoge*8jtLIMDTpEaVN3A$$&p=1rpJxJnOVBgo5ZzyMIJUZMb0L!sia3A9J
S6fPbzQmT*Pi3KB2tc3BkzF7WZZwYu2MihQI!CV71xnzDL1tH9pamhz2Fd9cJPva8iQbJ5cGsChF0II
P9ekAU*pdbe8eIG3r3HP8QDZ71iz0$.HTTP/1.1
Accept: image/gif, image/x-xbitmap, image/jpeg, image/pjpeg, */*
Accept-Language: en-us..Accept-Encoding:.gzip,.deflate
User-agent: Mozilla/4.0.(compatible;.MSIE.6.0;.Windows.NT.5.0;.Q312461;..NET.CLR.1.0.3705)
Host: dev-b.ptpartner1.test.microsoft.com
Connection: Keep-Alive..
http-body: none
```

What is claimed is:

1. A method of routing communication between a client computer and network servers, said client computer and said network servers being coupled to a data communication network, said client computer operating a browser configured to permit a user of the client computer to communicate on the data communication network, said method comprising:

providing a user interface from a first network server coupled to the data communication network, said first network server providing the user interface to the user of the client computer via the browser, said user interface requesting information to be retrieved from the user;

receiving the information retrieved from the user directly at a second network server coupled to the data communication network, said first and second network servers being in different domains on the data communication network;

validating, by the second network server, the information retrieved from the user;

providing a client state object from the second network server to the browser of the client computer after the information retrieved from the user is validated, said client state object having a domain attribute corresponding to the domain of the second network server;

receiving a request from the user via the browser of the client computer, said request being for a selected service to be provided by a third network server coupled to the data communication network;

issuing a first redirect command from the third network server to the client computer for directing the client computer to the second network server in response to the request from the user;

issuing a second redirect command from the second network server to the client computer for directing the client computer to the first network server for providing the user interface to the user; and issuing a third redirect command from the second network server directly to the client computer for directing the client computer to the third network server coupled to the data communication network, said third network server providing the selected service requested by the user.

2. The method of claim 1 wherein providing the user interface comprises rendering the user interface in a separate domain from the client state object.

3. The method of claim 1 further comprising directing the client computer from the second network server to the first network server for providing the user interface.

4. The method of claim 1 wherein the information retrieved from the user is posted to the second network server directly from the client computer.

5. The method of claim 1 wherein the information retrieved from the user comprises login information and further comprising:
receiving, at the second network server, a request from the third network server to authenticate the user when the user requests the selected service;
determining whether the user was already authenticated;
retrieving the login information from the user with the user interface provided by the first network server in response to when the user is determined not to have been authenticated; and
authenticating the user with the second network server by comparing the login information with authentication information stored in a database associated with the second network server.

6. The method of claim 5 further comprising directing the client computer back to the third network server providing the selected service after the user is authenticated by the second network server.

7. The method of claim 1 wherein the third network server is a portal for providing the user with a gateway to services provided by one or more other network servers coupled to the data communication network.

8. The method of claim 1 wherein the network servers are web servers and the data communication network is the Internet.

9. The method of claim 1 wherein the second network server is an authentication server associated with a multi-site user authentication system.

10. The method of claim 9 wherein the first network server is a user interface server associated with the authentication server.

11. The method of claim 1 wherein the client state object provided to the browser of the client computer by the second network server contains user profile and authentication information.

12. The method of claim 1 wherein the retrieved confidential information includes a login ID and a password associated with the login ID.

13. A method comprising:
receiving a request from a web server to authenticate a user of a client computer, said web server and said client computer being coupled to the data communication network and said user seeking access to the web server via the data communication network, said client computer operating a browser configured to permit the user to communicate on a data communication network;
directing the client computer from the web server to an authentication server in response to the request from the web server and then directing the client computer from the authentication server to a user interface server, said authentication server and said user interface server also being coupled to the data communication network, said authentication server and said user interface server being in different domains on the data communication network;
providing a user interface to the user via the browser for retrieving login information from the user, said user interface being provided to the user by the user interface server;
posting the login information retrieved from the user directly to the authentication server;
authenticating the user by the authentication server based on the login information retrieved from the user; and
when the user is determined to have been authenticated:
providing a cookie from the authentication server to the browser of the client computer, said cookie having a domain attribute corresponding to the domain of the authentication server; and
issuing a redirect command from the authentication server to the browser of the client computer for directing the client computer to directly back to the web server.

14. The method of claim 13 further comprising, before authenticating the user, determining whether the user was already authenticated and, when the user is determined not to have been authenticated, then retrieving the login information from the user with the user interface provided by the user interface server and authenticating the user with the authentication server by comparing the login information with authentication information stored in a database associated with the authentication server.

15. The method of claim 13 wherein the cookie provided to the browser of the client computer by the authentication server contains user profile and authentication information.

16. The method of claim 13 wherein directing the client computer from the web server to the authentication server and from the authentication server to the user interface server includes carrying over encoded information relating to the request from the web server.

17. The method of claim 13 wherein the user interface server is identified by a uniform resource locator and displayed to the user via the browser and further comprising removing query string information from the uniform resource locator of the user interface server before displaying to the user.

18. The method of claim 13 wherein the web server is a portal for providing the user with a gateway to services provided by one or more network servers coupled to the data communication network.

19. The method of claim 13 wherein the retrieved login information includes a login ID and a password associated with the login ID.

20. A system comprising:
- a first network server coupled to a data communication network, said first network server providing a user interface to the user of a client computer, said user interface requesting information to be retrieved from the user and being provided to the user via a browser operating on the client computer, said client computer being coupled to the data communication network, said browser being configured to permit a user of the client computer to communicate on the data communication network;
- a second network server coupled to the data communication network, said first and second network servers being in different domains on the data communication network, said second network server receiving and validating the information retrieved directly from the user, said information retrieved from the user is posted to the second network server from the client computer, said second network server further providing a client state object to the browser of the client computer after the information retrieved from the user is validated, said client state object having a domain attribute corresponding to the domain of the second network server; and
- a third network server coupled to the data communication network, said third network server receiving a request from the user via the browser of the client computer for a selected service to be provided by the third network server, wherein the third network server issues a redirect command for directing the client computer to the second network server in response to the request from the user, wherein the second network server issues a redirect command to the client computer for directing the client computer to the first network server for providing the user interface to the user, and wherein the second network server issues another redirect command for directing the client computer directly to the third network server when the second server validates the information retrieved from the user.

21. The system of claim 20 wherein the second network server directs the client computer to the first network server for providing the user interface.

22. The system of claim 20 wherein the information retrieved from the user comprises login information and further comprising a database associated with the second network server storing authentication information for comparison with the login information to authenticate the user.

23. The system of claim 22 wherein the second network server receives a request to authenticate the user when the user requests the selected service from the third network server, determines whether the user was already authenticated and, when the user is determined not to have been authenticated, then retrieves the login information from the user with the user interface provided by the first network server to authenticate the user.

24. The system of claim 23 wherein the second network server directs the client computer directly back to the third network server providing the selected service after authenticating the user.

25. The system of claim 20 wherein the third network server is a portal for providing the user with a gateway to services provided by one or more other network servers coupled to the data communication network.

26. The system of claim 20 wherein the network servers are web servers and the data communication network is the Internet.

27. The system of claim 20 wherein the second network server is an authentication server associated with a multi-site user authentication system.

28. The system of claim 27 wherein the first network server is a user interface server associated with the authentication server.

29. The system of claim 20 wherein the client state object provided to the browser of the client computer by the second network server contains user profile and authentication information.

30. The system of claim 20 wherein the retrieved login information includes a login ID and a password associated with the login ID.

* * * * *